United States Patent Office 3,024,198
Patented Mar. 6, 1962

3,024,198
EMULSIFIER COMPOSITION
John V. Harrington, Wallington, Michael Sandor, East Orange, and Maurice J. Kelley, Bloomfield, N.J., assignors to Nopco Chemical Company, Harrison, N.J., a corporation of New Jersey
No Drawing. Filed Apr. 28, 1958, Ser. No. 731,135
11 Claims. (Cl. 252—312)

The present invention relates to novel emulsifier systems and applications thereof. More particularly, this invention is directed to emulsifier systems containing two non-ionic components which are of great utility in the blending together of mineral oils and water to form oil-in-water emulsions of valuable utility.

Despite the fact that mineral oils and water have such unrelated and antagonistic properties such as their immiscibility and combustibility properties, these materials are used together in many industrial applications. For instance oil-in-water emulsions have been used as machining lubricants in metal working operations such as lathe work, cutting, drilling, reaming, etc. In these operations, the oil acts as a lubricating agent while the water acts as a high heat absorbing body to effectively cool the work and the tool. Likewise, hydraulic fluids for use in transmitting mechanical energy in brake and clutch systems, servo systems, aircraft and ship control mechanisms, etc., make use of oil, water emulsions. The oil component contributes to the lubricity of the fluid and mitigates wear of the moving portions with which it comes into contact, while the aqueous portion reduces combustibility of the fluid. Even in the salvaging and cleaning of metal drums contaminated with hard-to-remove oil and grease residues, water or steam has been used as the cleansing agent to combine with and effectively remove the oil or grease.

Thus the art has appreciated that there are many advantageous applications of mixtures of these two incompatible and antagonistic materials viz., mineral oils and water. Although mineral oils and water have been successfully combined by use of various emulsifying agents, such formulations as oil-in-water emulsions and water-in-oil emulsions are merely academic unless the emulsions are found to be successful in their applications. Concerning cutting oils, the emulsifier must be able to blend together the many grades of oils with the water in various quantities in order to eliminate frequent and time-consuming experimentation and proportioning each time a different oil is used or a variation in grade occurs or the ratio of oil and water is changed. Furthermore, the emulsion must be stable during use and must be clear rather than cloudy or milky so that it does not interfere with the ability of the operator to observe the cutting operation. It must also remain clear and stable even when large quantities of water are added to an existing formulation, since, for instance, a cutting fluid might contain as little as 0.5 percent oil. Also, the viscosity cannot be too high since this slows down the settling of metal chips thereby causing excessive tool wear due to the circulation of these chips. Too high a viscosity also interferes with the cooling capacity of the fluid and such high viscosity fluids lack the proper wedging action necessary to lubricate properly. In a similar manner, when oil-in-water emulsions are availed of as hydraulic fluids, they must be stable under all types of usage. They must not separate under large temperature variations or great mechanical stresses. Neither must they solidify. They must tolerate large quantities of water which contribute to their fire-resistant characteristics. Even in oil and grease removal problems, wherein it is desired to use water as the cleansing agent, it is necessary to be able to rapidly emulsify the oil or grease with water. Since the water may be used to clean a large number of drums, it must be capable of emulsifying and holding large quantities of oil and grease without breaking.

We have discovered that the above and other desiderata have been successfully accomplished in a new and unexpected manner. We have discovered that when a particular class of esters or mixtures thereof and a particular class of phenol-ethylene oxide condensates or mixtures thereof are admixed, a novel and successful emulsifying system for oil-in-water emulsions is obtained.

Our esters may be described as polyoxyethylene glycol monoesters of fatty acids having the formula $$RCOO(CH_2CH_2O)_nH$$

in which R is a saturated or unsaturated aliphatic hydrocarbon radical having from about 12 to 18 carbon atoms and $n$ represents an average number of from about 2 to 14. Suitable fatty acid substituents are oleyl, stearyl, ricinoleyl, palmityl, myristyl and lauryl. These esters may be prepared according to several different procedures. The first method is the direct esterification of the fatty acid with a polyoxyethylene glycol e.g., polyoxyethylene glycol, average molecular weight 100; polyoxyethylene glycol, average molecular weight 200; polyoxyethylene glycol, average molecular weight 300. Suitable fatty acids are oleic acid, ricinoleic acid, stearic acid, lauric acid and mixtures thereof as well as commercial mixtures such as coconut fatty acids. Such esterification is usually carried out at temperatures of from 140° to 180° C., in the presence of 0.05 to 0.2 percent by weight of the total reactants of an acid catalyst e.g., sulfuric acid. Another procedure for preparing these esters is to directly add or condense ethylene oxide on to the fatty acid. This reaction is usually carried out at temperatures of from 175° to 200° C. in the presence of from 0.1 to 0.3 percent by weight of the fatty acid of a catalyst such as sodium hydroxide. The ethylene oxide may vary from 2 to 14 moles in order to give a polyoxyethylene adduct which will equal in molecular weight that obtained from the aforementioned polyoxyethylene glycols. A third preparation of our esters involves a transesterification reaction between a triglyceride containing the desired fatty acid substituents and a polyoxethylene glycol. A transesterification catalyst, for instance, in the amount of 0.2 to 2.0 percent by weight of the total reactants, is present during reaction. An example of such catalyst is sodium hydroxide. The reaction temperature is usually from about 90° to 150° C. Suitable glycerides are mustard seed oil, coconut oil, soybean oil, castor oil and tallow. When our esters are prepared by the transesterification procedure, the final product will contain glycerine. However, we find that the presence of glycerine does not harm our emulsifier system, but on the contrary, esters prepared by transesterification represent a preferred material. Thus, useful esters prepared according to any of the preceding procedures are polyoxyethylene glycol 400 stearate; polyoxyethylene glycol 600 stearate; polyoxyethylene glycol 400 oleate; polyoxyethylene glycol 400 laurate and polyoxyethylene glycol 200 laurate in which the preceding numbers represent average molecular weights of the polyoxyethylene portions of the molecule.

Our phenol-ethylene oxide condensates may be represented by the formulas

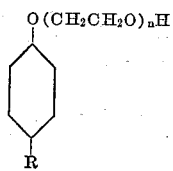

and

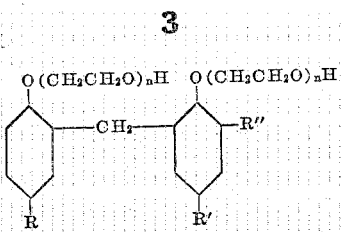

in which R is a primary, secondary or tertiary alkyl substituent having from one to 15 carbon atoms e.g., methyl, sec.-butyl, amyl, octyl, dodecyl, pentadecyl, R' and R'' may be the same as R or they may be —H and $n$ represents an average number of from about 5 to 15. These condensates are prepared by reacting ethylene oxide with a phenol such as p-sec. butyl phenol, p-octyl phenol, bis(o-hydroxy-p-octyl phenyl) methane, etc., or mixtures thereof at temperatures of from 150° to 200° C. in the presence of about 0.1 percent by weight of the phenol of a catalyst which may be sodium hydroxide or other alkali hydroxides or alkali metal carbonates. The reaction, if desired may be carried out under pressure e.g., 25 p.s.i. If a bis-phenol is used such may be prepared by reacting from 1.67 to 2.0 moles of a phenol such as p-amyl phenol, p-octyl phenol, etc., or mixtures thereof with one mole of formaldehyde or equivalent amounts of a substance liberating formaldehyde such as trioxane, paraformaldehyde, etc., at temperatures of from 65° to 105° C. for 2 to 6 hours. Thereafter the bis-phenol is reacted with the ethylene oxide.

To form the emulsifier system, the above described fatty acid ester and phenol-ethylene oxide condensate are mixed together in amounts from about 20 to 80 percent by weight of said ester to from about 80 to 20 percent by weight of said condensate. One of our preferred emulsifier systems is:

| | Percent by wt. |
|---|---|
| The condensate of bis(o-hydroxy-p-octyl phenyl) methane with 6 moles of ethylene oxide per phenolic hydroxyl | 40 |
| Polyoxyethylene glycol 400 monooleate (obtained from the transesterification of polyoxyethylene glycol 400 and mustard seed oil) | 60 |

The above emulsifier system was prepared as indicated in the following example.

EXAMPLE I

A. *Preparation of the Bis-Phenol Ethylene Oxide Condensate*

97.56 parts by weight of octyl phenol were melted at 70° C. Then 8.54 parts by weight of trioxane were added and the temperature adjusted to 65° to 70° C. after which 0.94 part by weight of hydrochloric acid was introduced with cooling to minimize violence of the reaction. Thereafter, the temperature of the mixture was allowed to rise to about 105° C. under reflux without agitation until the reaction slowed down at which time stirring was initiated until uniformity of the reaction mass was achieved. The mass was then neutralized to 0.1 percent alkali as KOH on a dry basis by the addition of 0.86 part by weight of a 50% by weight aqueous potassium hydroxide solution. This addition was followed by distillation of the reaction mass under vacuum at temperatures up to 120° C. to obtain the bis(o-hydroxy-p-octyl phenyl) methane.

40 parts by weight of the bis-phenol prepared according to the procedure of the preceding paragraph were warmed with agitation to 180° C. under a nitrogen atmosphere. Then 60 parts by weight of ethylene oxide were passed in and added on to the bis-phenol in the presence of potassium hydroxide as catalyst. The catalyst is the excess potassium hydroxide over neutralization added as indicated in the preceding paragraph. The temperature during ethylene oxide addition was maintained at 180° C. The bis-phenol ethylene oxide condensate was then recovered.

B. *Preparation of Polyoxyethylene Glycol 400 Monooleate*

57 parts by weight of mustard seed oil and 41 parts by weight of polyoxyethylene glycol having an average molecular weight of about 400 were charged in a vessel. To this mixture, 2 parts by weight of potassium hydroxide were added with agitation. This addition was followed by heating at 90° C. for two hours. The resulting ester was then recovered.

C. *Preparation of the Emulsifier System*

40 parts by weight of the product of part A were admixed with 60 parts by weight of the product of part B by simple stirring thereby forming the emulsifier system. This emulsifier system had the following properties:

| | |
|---|---|
| Appearance | Clear, amber liquid. |
| pH (2% aqueous solution) | 8.9. |
| Density | 8.5 lbs./gal. |
| Total alkali (as KOH, dry basis) | 1.1±0.1%. |
| Freeze-thaw cycle [1] | Excellent (no separation). |
| Lower cloud point [2] | Below 18° F. |
| Solubility of a 5% aqueous solution | Slight opalescence. |

[1] Freeze-thaw cycle in this and other examples was determined by freezing sample at about 5° C. and allowing it to come to room temperature slowly and observing whether separation occurred.
[2] Lower cloud point in this and the other examples was determined by cooling and observing temperature at which solution became cloudy.

Our emulsifier systems are used to form oil-in-water emulsions which are exceptionally useful as cutting oils, cutting oil bases and hydraulic fluids. These emulsions may have the following proportions:

| | Percent by wt. |
|---|---|
| Emulsifier system | About 30 |
| Mineral oil | About 25 |
| Water | About 40 |
| Gel breaker | About 5 |
| Coupling agent | 0 to 7 |
| Antioxidant | 0 to .5 |
| Anti-corrosion agent | 0 to 1 |

Suitable mineral oils are those of various viscosities having a low, medium or high viscosity index. Examples are Shell Carnea 35 oil; Primol D White Oil (Esso); 1268-Topaz Oil B (Atlantic), etc.

By coupling agents and gel breakers we mean the following. In many of our oil-in-water emulsions, a clear gel results which is of course unsuitable for further use. However, by the addition of gel breakers such as butyl Cellosolve (mono-butyl ether of ethylene glycol), propylene glycol, hexylene glycol, etc., the resulting product is rendered fluid. On the other hand, if the above oil-in-water emulsion formulation is to be further diluted with water e.g., for use as a cutting oil, then no gel breaker need be added. In many instances the emulsions are not brilliantly clear, but are hazy or slightly cloudy. However, we have found that the incorporation of relatively small amounts of a composition referred to as a coupling agent containing one or more carboxylic acid groups into a hazy or cloudy emulsion will render the emulsion brilliantly clear. Useful carboxylic acid containing compositions are aliphatic carboxylic acids having a carbon chain length of from about 6 to 22 carbon atoms, or mixtures thereof. Thus we may use fatty acids as caprylic acid, caproic acid, lauric acid, palmitic acid, stearic acid, oleic acid, etc., as well as commercial materials containing these fatty acids e.g., tall oil. Although the fatty acid when used is present in an amount of from about 0.5 percent to 7 percent by weight of the emulsion, we prefer from about 5.0 percent by weight of the emulsion. However, in many instances, no coupling agent is even necessary.

Suitable antioxidants are tertiary butyl hydroquinone and the various substituted phenols. Generally they are present in an amount of about 0.1 percent by weight of the total emulsion. We may also add anti-corrosion agents such as sodium nitrite or vapor corrosion inhibitors like benzyltrimethylammonium nitrite or dicyclohexylammonium nitrite. These are usually present in an amount of about 0.5 percent by weight of the total emulsion. Both the antioxidant and the anti-corrosion additives are well known materials useful in this art and the present invention is not to be limited to any particular additives or combinations thereof.

The above oil-in-water emulsions containing our emulsifier system are characterized by their extreme stability upon storage and during use, their excellent freeze-thaw cycle, their clarity and their capacity to be infinitely diluted with water and still remain clear. Such properties are in no small amount due to our novel emulsifier system. The two components thereof act in a synergistic manner with respect to the mineral oil and the water thereby forming the superior emulsions. This synergism is all the more in evidence since neither component of our emulsifier system by itself can be utilized to produce oil-in-water emulsions having comparable properties. The following example illustrates the preparation of a highly superior cutting oil making use of the emulsifier system of Example I.

EXAMPLE II

Percent by wt.
Condensate of bis(o-hydroxy-p-octyl phenyl) methane with 6 moles of ethylene oxide per mole of phenolic hydroxyl _____ 12
Polyoxyethylene glycol 400 oleate (obtained from the transesterification of polyoxyethylene glycol 400 and mustard seed oil)_____ 18
Shell Carnea 35 Oil (350–370 SUS @ 100° F., naphthenic base V.I. 60)_____ 25
Water _____ 40
Butyl Cellosolve_____ 5

The above formulation was prepared by simple mixing of the ingredients in the following manner. The mineral oil was placed in a mixing vessel and the emulsifier system added thereto with stirring until uniform. The mixture was then treated with butyl Cellosolve added gradually with mild stirring. Finally the water was added with stirring.

This emulsion formulation had the following properties:

Color_____ Clear, amber liquid.
Upper cloud point [1]_____ >190° F.
Lower cloud point_____ 23° F.
Freeze-thaw cycle_____ Excellent (no separation).
Viscosity_____ 420 cps. (Brookfield).

[1] Upper cloud point in this and the other examples was determined by warming and observing temperature at which solution became cloudy.

The product of Example II may be used as a cutting oil, a cutting oil base, and as a hydraulic fluid. If desired it may be diluted with up to an infinite amount of water and still retain its clarity.

EXAMPLE III

In this example the emulsifier system was prepared as in Example I while the oil-in-water emulsion was prepared as in Example II.

Percent by wt.
Condensate of bis(o-hydroxy-p-octyl phenyl) methane with 6 moles of ethylene oxide per each phenolic hydroxyl_____ 10.02
Polyoxyethylene glycol 400 oleate (obtained from transesterification of polyoxyethylene glycol 400 and mustard seed oil)_____ 19.98
Shell Carnea 35 Oil_____ 25
Water _____ 40
Butyl Cellosolve_____ 5

The emulsifier system had the following properties:

Appearance_____ Brilliantly clear.
Total alkali (as KOH, dry basis)  1.3%.
Freeze-thaw cycle_____ Excellent (no separation).
Specific gravity_____ 1.022.
pH (2% aqueous solution)_____ 9.2.
Lower cloud point_____ <18° F.
Solubility of a 5% aqueous solution__ Slight opalescence.

The emulsion had the following properties:

Color_____ Brilliantly clear.
Upper cloud point_____ >190° F.
Lower cloud point_____ 23° F.
Freeze-thaw cycle_____ Excellent (no separation).

The following table illustrates oil-in-water emulsions in which varying ratios of the two components of the emulsifier system are used. The emulsions contain the following:

Percent by wt.
Emulsifier system_____ 30
Shell Carnea 35 Oil_____ 25
Water _____ 40
Butyl Cellosolve_____ 5

The data also illustrate the unexpected synergism due to the two component emulsifier system. The last column of data pertains to an aqueous emulsion obtained by diluting the above emulsion with water until it comprises only 5% by weight of the total.

TABLE I

| Emulsifier system | | | | Cloud point of emulsion (° F.) | | |
|---|---|---|---|---|---|---|
| Condensate of bis(o-hydroxy-p-octyl phenyl) methane with 6 moles of ethylene oxide per each phenolic hydroxyl, percent | Polyoxyethylene glycol 400 monooleate (obtained from the transesterification of polyoxyethylene glycol 400 and mustard seed oil, percent | Clarity of oil-in-water emulsion | Percent by weight of total emulsion of oleic acid added to clear emulsion | Low | High | Clarity of oil-in-water emulsion diluted with 95% by weight of the total with water |
| 100 | 0 | Cloudy | [1] 5 | ------ | 122 | Cloudy. |
| 90 | 10 | ---do--- | 5 | 33 | >190 | Clear. |
| 80 | 20 | ---do--- | 4 | 33 | >190 | Do. |
| 70 | 30 | ---do--- | 2 | 32 | >190 | Do. |
| 60 | 40 | ---do--- | 2 | 30 | >190 | Do. |
| 50 | 50 | ---do--- | 0.5 | 48 | >190 | Do. |
| 45 | 55 | Clear | 0 | <25 | >190 | Do. |
| 40 | 60 | ---do--- | 0 | <25 | >190 | Do. |
| 35 | 65 | ---do--- | 0 | <25 | >190 | Do. |
| 30 | 70 | ---do--- | 0 | 32 | >190 | Do. |
| 20 | 80 | ---do--- | 0 | 45 | >190 | Do. |
| 10 | 90 | Cloudy | [1] 5 | ------ | ------ | |
| 0 | 100 | ---do--- | [1] 5 | ------ | ------ | |

[1] 5% oleic acid added to emulsion would not clear it.

The following table illustrates various mineral oils that may be used in our emulsions. The emulsions contain the following:

Percent by wt.
Condensate of bis(o-hydroxy-p-octyl phenyl) methane with 6 moles of ethylene oxide per each phenolic hydroxyl_____ 12
Polyoxyethylene glycol 400 monooleate (obtained from transesterification of polyoxyethylene glycol 400 and mustard seed oil)_____ 18
Mineral oil_____ 25
Water _____ 40
Butyl Cellosolve_____ 5

TABLE II

| Mineral oil | | | | Clarity of emulsion | Percent by weight of total emulsion of oleic acid added to clear emulsion | Cloud point of emulsion (° F.) | | Clarity of oil-in-water emulsion diluted with 95% by weight of the total of water |
|---|---|---|---|---|---|---|---|---|
| Mfr. | Designation | Viscosity (Saybolt) | Viscosity index [1] | | | Low | High | |
| Esso | Primol D white oil | 365 | 75 | Cloudy | 1.5 | 28 | 122 | Clear. |
| Sun | 210 solvent refined oil | 210 | 90 | do | 1.0 | 38 | 203 | Do. |
| Do | 310 solvent refined oil | 310 | 90 | do | 1.5 | 48 | 106 | Do. |
| Do | 350 solvent refined oil | 350 | 90 | do | 2.5 | 32 | 203 | Do. |
| Shell | LVI 100 neutral M | 100 | 43 | Clear | 0 | 50 | >212 | Do. |
| Do | 100 neutral | 100 | | Cloudy | 1.0 | 44 | >212 | Do. |
| Atlantic | 1268-Topaz oil B | | 65 | Clear | 0 | [2] 28 | >212 | Do. |
| Gulf | 372 paraffin | 100 | 62 | do | 0 | >50 | >190 | Do. |

[1] Low viscosity index (LVI) oils have an index of less than about 60, medium viscosity index (MVI) oils about 60-80, high viscosity index (HVI) oils above about 80.
[2] Froze.

The following table employs various polyoxyethylene glycol fatty acid esters in the emulsifier system. The emulsions contain the following:

| | Percent by wt. |
|---|---|
| Condensate of bis(o-hydroxy-p-octyl phenyl) methane with 6 moles of ethylene oxide per each phenolic hydroxyl | 12 |
| Fatty acid ester | 18 |
| Shell Carnea 35 Oil | 25 |
| Water | 40 |
| Butyl Cellosolve | 5 |

The following two tables illustrate various phenol-ethylene oxide condensates that may be used in the emulsifier system. The emulsions contain the following:

| | Percent by wt. |
|---|---|
| Phenol-ethylene oxide condensate | 12 |
| Polyoxyethylene glycol 400 oleate (obtained from the transesterification of polyoxyethylene 400 and mustard seed oil) | 18 |
| Shell Carnea 35 Oil | 25 |
| Water | 40 |
| Butyl Cellosolve | 5 |

TABLE III

| Fatty acid ester | | | Clarity of emulsion | Percent by weight of total emulsion of oleic acid added to clear emulsion | Cloud point of emulsion (° F.) | | Clarity of oil-in-water emulsion diluted with 95% by weight of the total of water |
|---|---|---|---|---|---|---|---|
| Alkyl group | Mol. weight of ethylene oxide chain | Method of preparation | | | Low | High | |
| Stearic | 400 | Esterification | Cloudy | 1.5 | >60 | 140 | Clear. |
| Do | 600 | Transesterification | do | 3.5 | >60 | | Do. |
| Oleic | 375 | Ethylene oxide add'n | do | 1.5 | 49 | 129 | Cloudy. |
| Do | 400 | Transesterification | Clear | 0 | <25 | >190 | Clear. |
| Do | 600 | Esterification | Cloudy | 4.0 | 60 | 131 | Cloudy. |
| Lauric [2] | 100 | Transesterification | Clear | 0 | 38 | >212 | Do. |
| Do.[2] | 200 | do | Very sl. hazy. | 1.5 | 28 | 163 | Very sl. hazy. |
| Do.[3] | 400 | Ethylene oxide add'n | Cloudy | 4.0 | [1] 28 | 115 | Clear. |
| Do.[3] | 400 | Esterification | do | 4.0 | 37 | 133 | Cloudy. |
| Do.[3] | 600 | do | do | 5.0 | 37 | 133 | Do. |
| Do.[3] | 600 | Transesterification | do | 3.0 | 30 | 124 | Clear. |

[1] Froze.
[2] Coconut oil used in transesterification.
[3] Coconut fatty acids used in these reactions.

TABLE IV

| Alkyl groups on disphenol | Moles of ethylene oxide per mole of phenolic hydroxyl | Clarity of emulsion | Percent by weight of total emulsion of oleic acid added to clear emulsion | Cloud point of emulsion (° F.) | | Clarity of oil-in-water emulsion diluted with 95% by weight of the total of water |
|---|---|---|---|---|---|---|
| | | | | Low | High | |
| p,p'-di-sec. Butyl | 10 | Cloudy | 4.0 | <25 | >212 | Clear. |
| Do | 14 | do | 5.0 | <25 | 116 | Do. |
| p,p'-di-Octyl | 6 | Clear | 0 | <25 | >190 | Do. |
| p,p'-di-Dodecyl | 8.3 | Cloudy | 2.0 | >48 | >212 | Do. |
| p-Methyl-p'-pentadecyl | 5.1 | Clear | 0 | >48 | >212 | Do. |
| p-Octyl-o'-p'-dioctyl | 4.9 | do | 0 | >60 | >212 | Do. |

TABLE V

| Alkyl groups on phenol (C₆H₅OH) | Moles of ethylene oxide | Clarity of emulsion | Percent by weight of total emulsion of oleic acid added to clear emulsion | Cloud point of emulsion (° F.) | | Clarity of oil-in-water emulsion diluted with 95% by weight of the total of water |
|---|---|---|---|---|---|---|
| | | | | Low | High | |
| p-isopropyl | 12 | Cloudy | 7 | 30 | | Clear. |
| p-octyl | 6 | Clear | 0 | 38 | >212 | Do. |
| Do | 8 | do | 0 | [1] 32 | 188 | Do. |
| p-dodecyl | 7 | Cloudy | 0.5 | 30 | 129 | Hazy. |
| Do | 9 | do | 0.5 | 30 | 129 | Do. |

[1] Froze.

Referring again to Table IV, the versatility of our emulsifier systems and oil-in-water emulsions is clearly evident. For instance, the emulsions containing the bis(p-sec. butyl phenyl) methane ethylene oxide (10 moles) condensate and the bis(p-octyl phenyl) methane ethylene oxide condensate are useful as cutting oils, and as hydraulic fluids. When diluted with 95% by weight of water, the resulting emulsion, because of its clarity, may be used as a cutting oil. Thus the undiluted emulsion can be said to be a very useful cutting oil base in addition to being a cutting oil and a hydraulic fluid. On the other hand, the oil-in-water emulsion containing the bis(p-dodecyl phenyl) methane ethylene oxide condensate, because its lower cloud point is relatively elevated is not desirable as a hydraulic fluid. However, when diluted with 95% by weight of water, the resulting emulsion, because of its clarity, may be used as a cutting oil. Hence, the undiluted emulsion, although not especially desirable as a hydraulic fluid is useful as a cutting oil base.

When it is desired to remove oil and grease from steel drums, several procedures may be used. For instance, the emulsifier system comprising the phenol-ethylene oxide condensate and polyoxyethylene glycol fatty acid monoester along with ancillary materials such as sodium silicate and sodium hydroxide are dissolved in a tank of water. The temperature of the solution is maintained at about 170° F. Thereafter, the drums are placed in the tank and the solution is circulated over their surfaces. In this manner, the oil and grease are effectively removed from the drums.

It is of course understood that the above described examples of our emulsifier system as well as oil-in-water emulsions containing same are not limiting since other modifications and embodiments within the scope of our invention will occur to those skilled in the art.

Having thus described our invention what we claim as new and desire to secure by Letters Patent is:

1. An emulsifier composition comprising from about 45% to 35% by weight of a condensate of bis (o-hydroxy-p-octyl phenyl) methane with about 6 mols of ethylene oxide per each hydroxyl group and from about 55% to 65% by weight of polyoxyethylene glycol oleate wherein the polyoxyethylene moiety has an average molecular weight of about 400.

2. An emulsifier composition comprising about 40% by weight of a condensate of bis(o-hydroxy-p-sec. butyl phenyl) methane with about 10 mols of ethylene oxide per each hydroxyl group and about 60% by weight of polyoxyethylene glycol oleate wherein the polyoxyethylene moiety has an average molecular weight of about 400.

3. An emulsifier composition comprising (a) about 40 percent by weight of the condensate of bis(o-hydroxy-p-octyl phenyl) methane and about 6 mols of ethylene oxide per each phenolic hydroxyl and (b) about 60 percent by weight of polyoxyethylene glycol oleate in which the polyoxyethylene moiety has an average molecular weight of about 400.

4. The emulsifier composition of claim 3 in which said polyoxyethylene glycol oleate is obtained by the transesterification of polyoxyethylene glycol having an average molecular weight of about 400 and mustard seed oil.

5. An emulsifier composition comprising (a) about 33.4% by weight of the condensate of bis(o-hydroxy-p-octyl phenyl) methane and about 6 mols of ethylene oxide per each phenolic hydroxyl and (b) about 66.6% by weight of polyoxyethylene glycol oleate in which the polyoxyethylene moiety has an average molecular weight of about 400.

6. The emulsifier composition of claim 5 in which said polyoxyethylene glycol oleate is obtained by the transesterification of polyoxyethylene glycol having an average molecular weight of about 400 and mustard seed oil.

7. An oil-in-water emulsion comprising (1) about 30 parts by weight of an emulsifier composition comprising from about 45% to 35% by weight of a condensate of bis(o-hydroxy-p-octyl phenyl) methane with about 6 mols of ethylene oxide per each hydroxyl group and from about 55% to 65% by weight of polyoxyethylene glycol oleate wherein the polyoxyethylene moiety has an average molecular weight of about 400, (2) about 25 parts by weight of a mineral oil and (3) at least 40 parts by weight of water.

8. An oil-in-water emulsion comprising (1) about 30 parts by weight of an emulsifier composition comprising about 40% by weight of a condensate of bis(o-hydroxy-p-sec. butyl phenyl) methane with about 10 mols of ethylene oxide per each hydroxyl group and about 60% by weight of polyoxyethylene glycol oleate wherein the polyoxyethylene moiety has an average molecular weight of about 400, (2) about 25 parts by weight of a mineral oil and (3) at least 40 parts by weight of water.

9. An oil-in-water emulsion comprising (1) about 30 parts by weight of an emulsifier composition comprising (a) about 40 percent by weight of the condensate of bis(o-hydroxy-p-octyl phenyl) methane and about 6 mols of ethylene oxide per phenolic hydroxyl and (b) about 60 percent by weight of polyoxyethylene glycol oleate in which the polyoxyethylene moiety has an average molecular weight of about 400, (2) about 25 parts by weight of mineral oil, (3) at least 40 parts by weight of water and (4) about 5 parts by weight of the mono-butyl ether of ethylene glycol.

10. The oil-in-water emulsion of claim 9 in which said polyoxyethylene glycol oleate is obtained from the transesterification of polyoxyethylene glycol having an average molecular weight of about 400 and mustard seed oil.

11. An oil-in-water emulsion comprising (1) 30 parts by weight of an emulsifier composition comprising (a) about 33.4 percent by weight of the condensate of bis (o-hydroxy-p-octyl phenyl) methane and 6 mols of ethylene oxide per phenolic hydroxyl and (b) about 66.6 percent by weight of polyoxyethylene glycol oleate in which the polyoxyethylene moiety has an average molecular weight of about 400, (2) 25 parts by weight of mineral oil, (3) at least 40 parts by weight of water and (4) 5 parts by weight of the mono-butyl ether of ethylene glycol.

References Cited in the file of this patent

UNITED STATES PATENTS

| | | |
|---|---|---|
| 1,970,578 | Schoeller et al. | Aug. 21, 1934 |
| 2,629,697 | Langdon et al. | Feb. 24, 1953 |
| 2,773,041 | Larsen et al. | Dec. 4, 1956 |
| 2,819,996 | Riley | Jan. 14, 1958 |
| 2,834,731 | Carpenter | May 13, 1958 |